United States Patent
Makofsky et al.

(10) Patent No.: US 9,465,927 B2
(45) Date of Patent: Oct. 11, 2016

(54) VALIDATING INPUT BY DETECTING AND RECOGNIZING HUMAN PRESENCE

(71) Applicant: Disney Enterprises, Inc., Burbank, CA (US)

(72) Inventors: Steven Makofsky, Sammamish, WA (US); Paul Cutsinger, Redmond, WA (US)

(73) Assignee: Disney Enterprises, Inc., Burbank, CA (US)

( * ) Notice: Subject to any disclaimer, the term of this patent is extended or adjusted under 35 U.S.C. 154(b) by 80 days.

(21) Appl. No.: 13/633,394

(22) Filed: Oct. 2, 2012

(65) Prior Publication Data
US 2014/0096272 A1  Apr. 3, 2014

(51) Int. Cl.
*G06F 1/26* (2006.01)
*G06F 21/31* (2013.01)

(52) U.S. Cl.
CPC ....... *G06F 21/31* (2013.01); *G06F 2221/2133* (2013.01)

(58) Field of Classification Search
CPC ..... G06F 21/30; G06F 21/32; H04L 63/0861
USPC .......... 713/189, 155; 726/5, 14, 16; 455/411
See application file for complete search history.

(56) References Cited

U.S. PATENT DOCUMENTS

| | | | |
|---|---|---|---|
| 8,001,055 B2 * | 8/2011 | Weiss | 705/76 |
| 8,261,071 B2 * | 9/2012 | Buch | G06Q 10/107 713/150 |
| 8,335,931 B2 * | 12/2012 | Lee et al. | 713/192 |
| 8,346,556 B2 * | 1/2013 | Stewart et al. | 704/257 |
| 8,347,103 B2 * | 1/2013 | Jones et al. | 713/184 |
| 8,386,773 B2 * | 2/2013 | Sherkin | G06Q 20/3226 713/155 |
| 8,423,785 B2 * | 4/2013 | Takikawa et al. | 713/186 |
| 2009/0113294 A1 * | 4/2009 | Sanghavi et al. | 715/269 |
| 2009/0241174 A1 * | 9/2009 | Rajan | G06F 21/31 726/5 |
| 2009/0312093 A1 * | 12/2009 | Walker | G07F 17/32 463/25 |
| 2009/0319782 A1 * | 12/2009 | Lee | 713/156 |
| 2009/0320123 A1 * | 12/2009 | Yu et al. | 726/16 |
| 2010/0220900 A1 * | 9/2010 | Orsley | G06F 3/0421 382/124 |
| 2010/0262585 A1 * | 10/2010 | Rosikiewicz | G06F 11/1469 707/679 |

(Continued)

OTHER PUBLICATIONS

Oliver Brdiczka, Detecting Human Behavior Models, Dec. 2008, IEEE, vol. 6, pp. 588-597.*

*Primary Examiner* — Dede Zecher
*Assistant Examiner* — Viral Lakhia
(74) *Attorney, Agent, or Firm* — Patterson + Sheridan, LLP

(57) ABSTRACT

Techniques are disclosed for validating input on a handheld device. In response to receiving an input and a request to access a computing resource, an application running on the handheld device may collect data from one or more sensors of the handheld device. The application may then determine, based on the collected sensor data, if an individual is interacting with the device and recognize the input as valid if such is the case. In one embodiment, the application may present a challenge to a user which is difficult for computer programs to perform, and determine whether an individual is interacting with the device based on successful completion of the challenge. In an alternative embodiment, the application may collect data and determine whether an individual is interacting with the device without presenting an explicit challenge to the user.

22 Claims, 6 Drawing Sheets

(56) References Cited

U.S. PATENT DOCUMENTS

| | | | |
|---|---|---|---|
| 2011/0320823 A1* | 12/2011 | Saroiu | G06F 21/57 713/189 |
| 2012/0164978 A1* | 6/2012 | Conti | G06F 21/32 455/411 |
| 2012/0166409 A1* | 6/2012 | Saxena | G06F 17/30976 707/705 |
| 2013/0191908 A1* | 7/2013 | Klein | 726/18 |
| 2013/0205387 A1* | 8/2013 | Le | G06F 21/316 726/19 |
| 2015/0007289 A1* | 1/2015 | Godse | G06F 21/31 726/7 |

* cited by examiner

VALIDATING INPUT BY DETECTING AND RECOGNIZING HUMAN PRESENCE

BACKGROUND

1. Field of the Invention

The present invention relates to user authentication techniques and, in particular, to techniques for validating input by detecting and recognizing human presence.

2. Description of the Related Art

Handheld devices, such as mobile phones, have evolved to provide sophisticated computing platforms, complete with large display areas, touch-sensitive surfaces, among other components. Further, the computing power of these devices has steadily increased, allowing sophisticated computing applications to be executed from the palm of one's hand. Recently, handheld devices have been introduced which include sensors which can acquire physical data about the devices' position, orientation, motion, and surrounding environment, among other things. For example, accelerometers and gyroscopes on handheld devices may allow applications to sense and respond to changes in acceleration and spatial orientation as the devices are tilted in different axes.

Applications running on handheld devices may receive inputs which need to be validated as human inputs. For example, applications may validate login credentials as user-entered so as to prevent automated scripts from accessing a given service, attempting to guess username/password combinations, and the like. One approach for validating input as human input uses CAPTCHA challenges which typically present images of distorted text. Humans are typically better than computer programs at reading such distorted text.

SUMMARY

Embodiments of the invention provide a technique for validating input on handheld devices. One embodiment of the invention includes a method for validating input on a device. The method includes collecting data from one or more sensors of the device and determining whether the collected data indicates an individual is interacting with the device. The method further includes recognizing the input as valid if the collected data is consistent with the individual interacting with the device.

Another embodiment of the invention includes a computer-readable storage medium storing instructions that, when executed by a processor, cause a computer system to perform an operation for validating input on a device. The operation includes collecting data from one or more sensors of the device and determining whether the collected data indicates an individual is interacting with the device. The operation further includes recognizing the input as valid if the collected data is consistent with the individual interacting with the device.

Still another embodiment of the invention includes a system with a processor; and a memory configured to perform an operation for validating input on a device. The operation includes collecting data from one or more sensors of the device and determining whether the collected data indicates an individual is interacting with the device. The operation further includes recognizing the input as valid if the collected data is consistent with the individual interacting with the device.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide techniques for validating input on a handheld device. In this context, validating input refers to a mechanism which ensures that input was entered by a human, as opposed to, e.g., a computer program. In response to receiving the input and a request to access a computing resource, an application running on the handheld device may collect data from sensors on the handheld device for determining human presence. As used herein, "computing resource" includes resources provided on the device (e.g., an application, a user interface, a hardware resource etc.), as well as external resource (e.g., a server, external storage, etc.). The sensors may be configured to acquire physical data about, e.g., the device's position, orientation, and surrounding environment, among other things. The application may determine, based on the collected sensor data, if an individual is interacting with the device and recognize the input as valid if such is the case.

In one embodiment, the application may present a challenge to a user which is difficult for computer programs to perform, and determine whether an individual is interacting with the device based on the user successfully performing the challenge. For example, the application may challenge the user to shake the device and determine, based on collected sensor data (e.g., accelerometer data), whether the handheld device has, in fact been shaken. In such a case, the application may validate an input as user input if the device is determined to be shaking. In an alternative embodiment, the test for determining whether an individual is interacting with the device may be transparent to a user such that the user is unaware that input is being validated or that human interaction with the device is being determined. For example, the application may collect accelerometer data and determine whether a human is interacting with the device based on whether the device is moving (as opposed to still), without notifying the user or presenting an express challenge requiring an express response. In such a case, the application may validate an input by determining whether the device is moving, thereby suggesting that a human is holding the device.

Figure 1:
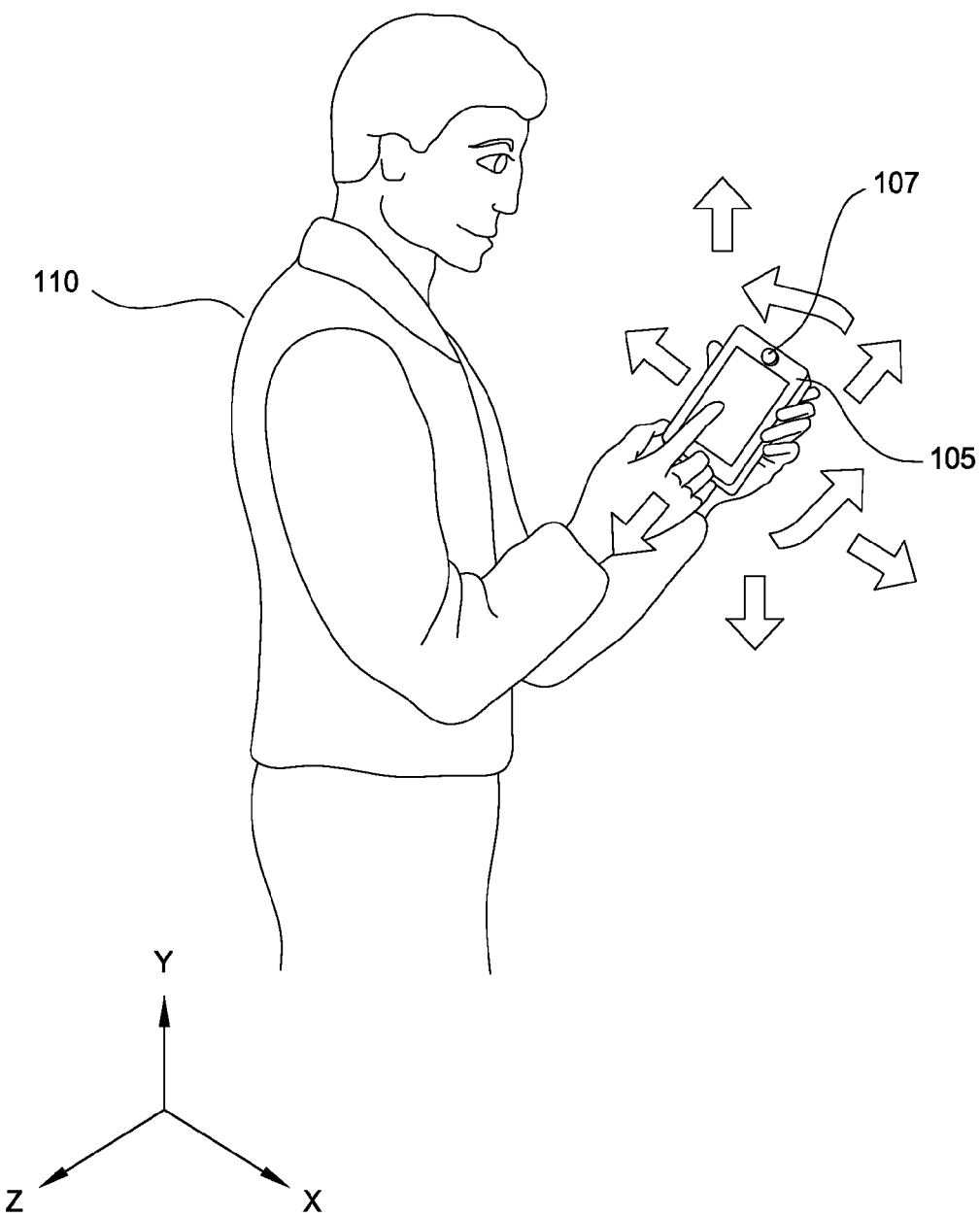
FIG. 1 is a diagram illustrating an example of a user manipulating a handheld device, according to one embodiment of the invention.

FIG. 1 is a diagram illustrating an example of a user 110 manipulating a handheld device 105, according to one embodiment. As shown, the user 110 is holding the device 105, which includes a camera 107. The camera 107 may provide a CCD device configured to capture still-images and video. The device 105 may further include other sensors (not shown) for acquiring physical data about, e.g., the device's position, orientation, and surrounding environment, among other things.

Illustratively, the user 110 may move the handheld device 105 in various ways, and the accelerometer(s), gyroscope(s), and other sensors may measure the handheld device's 105 position, orientation, surrounding environment, etc. as the handheld device 105 moves. Based on such measurements, an application on the handheld device may determine whether an individual is interacting with the device. For example, the application may invoke an API provided by an operating system of the handheld device 105 to collect sensor data. The application may then use the data to determine whether the movement of the device, images and sounds recorded, and other measurements are consistent with an individual interacting with the device, as discussed in greater detail below.

Figure 2:
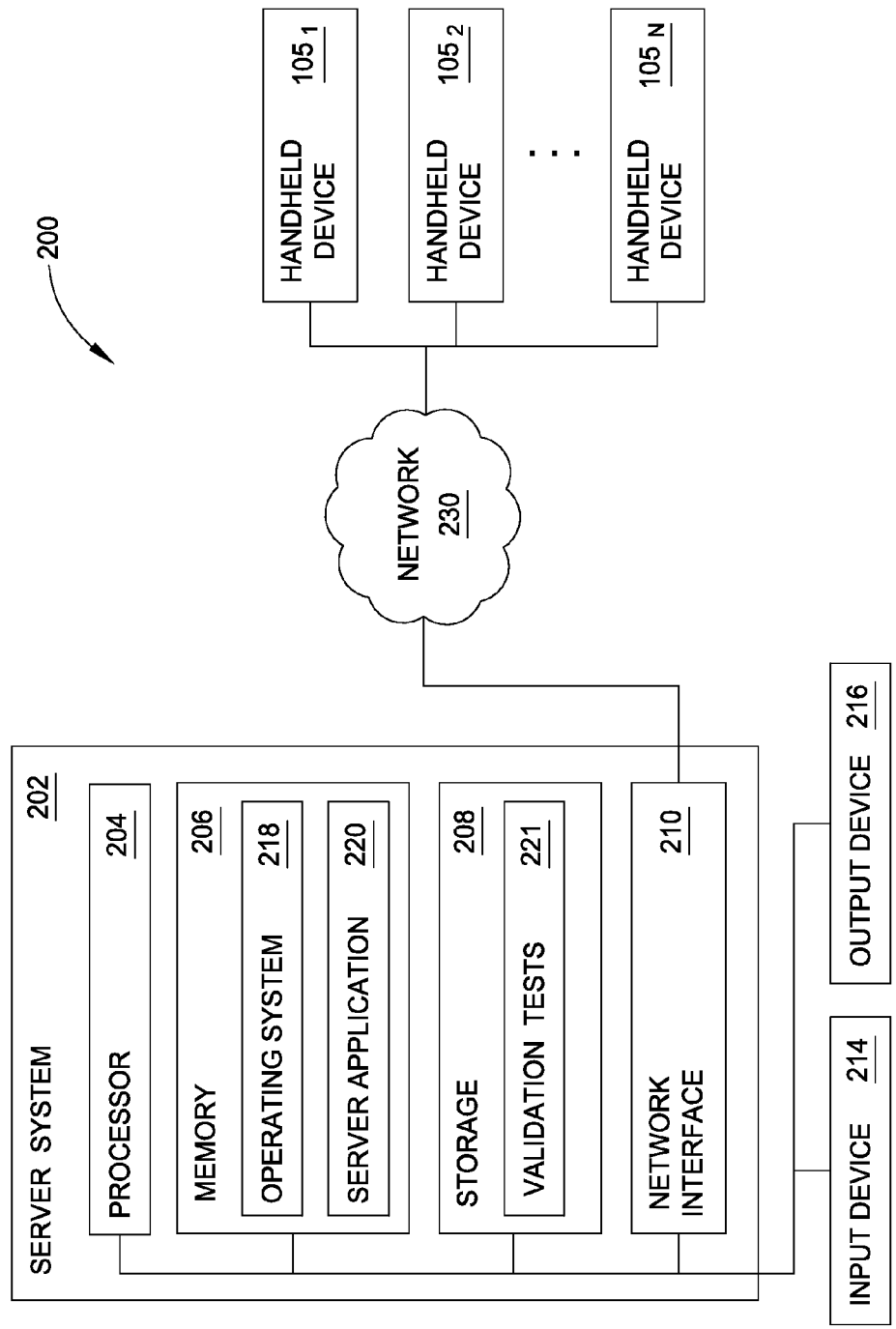
FIG. 2 illustrates a system configured to validate input by determining whether an individual is interacting with the device, according to one embodiment of the invention.

FIG. 2 illustrates a system configured to validate input by determining whether an individual is interacting with the device, according to one embodiment. The system 100 includes a server system 102. The server system 102 may be connected to handheld devices via a network 130. In general, the network 130 may be a telecommunications network and/or a wide area network (WAN). In a particular embodiment, the network 130 is the Internet. As shown, the server system 102 is connected to handheld devices ($105_{1-N}$) through Network 130.

The server system 102 generally includes a processor 104 connected via a bus 112 to a memory 106, a network interface device 110, a storage 108, an input device 114, and an output device 116. The server system 102 is generally under the control of an operating system (not shown). Examples of operating systems include the UNIX® operating system, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. The network interface device 110 may be any type of network communications device allowing the server system 102 to communicate with the handheld devices $105_{1-N}$ via the network 130.

The input device 114 may be any device for providing input to the server system 102. For example, a keyboard and/or a mouse may be used. The output device 116 may be any device for providing output to a user of the server system 102. For example, the output device 116 may be any conventional display screen or set of speakers. Although shown separately from the input device 114, the output device 116 and input device 114 may be combined. For example, a display screen with an integrated touch-screen may be used.

Illustratively, the memory 106 includes a server application 120. The server application 120 provides a software application configured to serve validation tests to clients (e.g., handheld devices $105_{1-N}$). In one embodiment, the server system 102 may receive a message from a client requesting a validation test and, in response, serve a validation test to the client via network 230. For example, a user may navigate to a login screen of a handheld device application. Then, the handheld device application may request a validation test to validate a human user is controlling the handheld device. In response, the server application 220 may serve a validation test to the handheld device via the network 230. Note, the particular validation test which is served may generally change over time to make it difficult for computer programs to be developed that can pass the test.

As shown, storage 108 includes validation tests 221, which may include various challenges presented to users, as well as transparent tests. Each validation test may include program instructions, as well as relevant images, text, and the like. For example, tests which present challenges to users may be configured to present text messages such as "Walk 5 feet in any direction," "Shake me!," "Shake your head," etc. on a display screen of the handheld device. The tests may also collect data from appropriate sensors, such as accelerometers, gyroscopes, cameras, and the like, to determine whether the challenge has been completed. For example, to determine whether the device has moved 5 feet, has been shaken, whether the user has shaken his/her head, etc. In general, challenges may be designed so that automated programs have difficulty performing them. As a result, the validation tests may indicate that input is valid if the challenges are completed, and vice versa.

In contrast, the transparent tests may determine whether input was entered by a user without the user being aware of such determination. For example, a transparent test may collect accelerometer data and determine based on the data whether the handheld device is moving as it would if held in a human's hands. Note, the user need not be notified that such a determination is being made. As a result, the user need not be aware that input is being validated or that human interaction with the device is being determined. In one embodiment, non-transparent tests may be provided if transparent test(s) are unable to confirm that an individual is interacting with the device. For example, the motion-based transparent test described above may fail to detect that an individual is interacting with the device if the device is placed on a table, rather than held in a human's hands. In such a case, the handheld device application may be configured to present a challenge test explicitly after being unable to confirm whether an individual is interacting with the device using a transparent evaluation.

Figure 3:
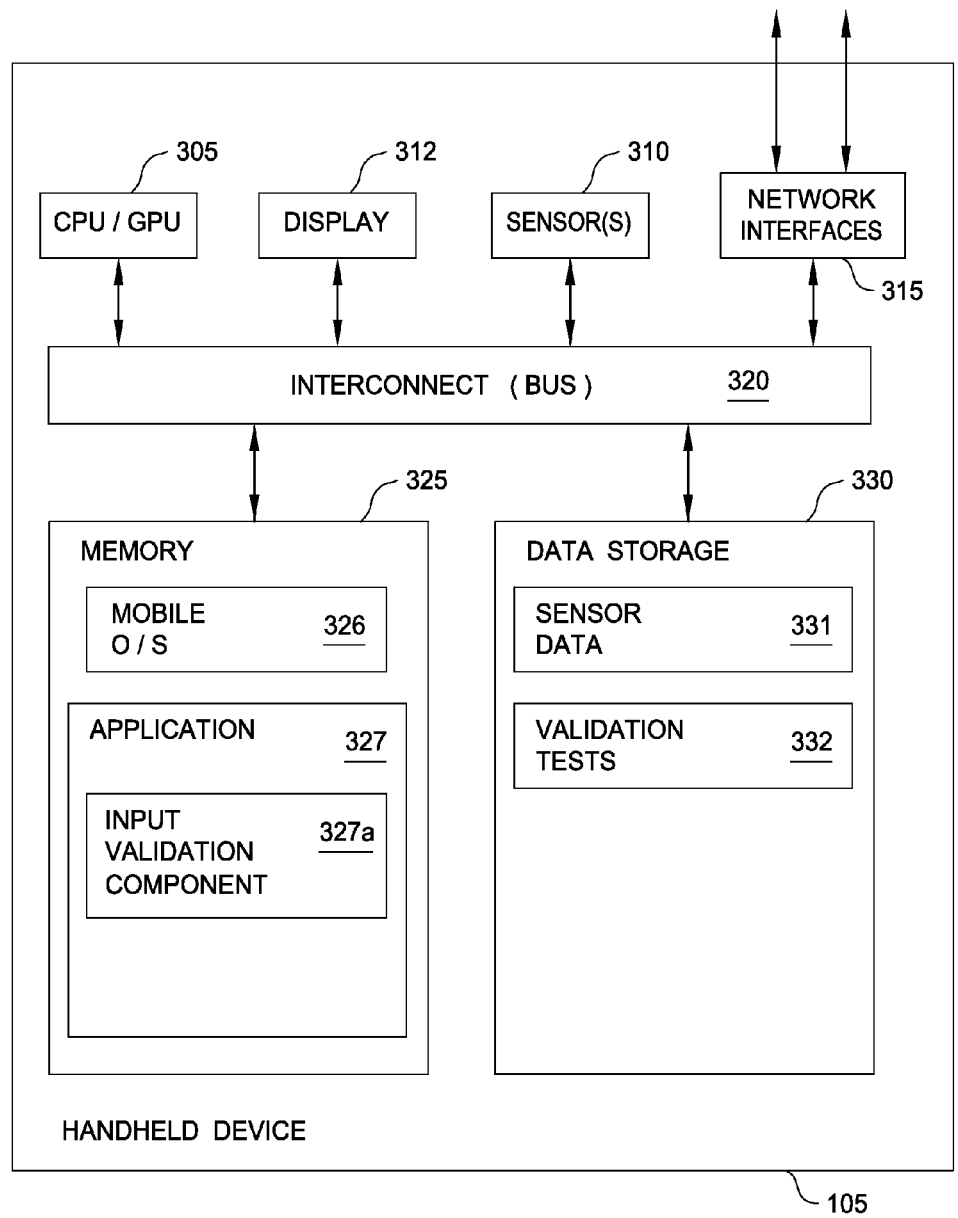
FIG. 3 illustrates an example of a handheld device, according to one embodiment of the invention.

FIG. 3 illustrates an example of a handheld device, according to one embodiment of the invention. In this example, the handheld device 105 is presumed to be handheld telephone with a touch sensitive display 312 and accelerometers 310. Of course, embodiments of the invention may be adapted for use with a variety of computing devices, including PDAs, handheld video game systems, tablet computers, and other computing devices having a display screen and sensors.

As shown, the handheld device 105 includes, without limitation, a central processing unit and graphics processing unit (CPU/GPU) 305, network interfaces 315, an interconnect 320, a memory 325, and storage 330. In addition, the hand device includes a touch sensitive display 312 and sensor(s) 310. As discussed, the sensor(s) 310 may generally acquire physical data about, e.g., the device's position, orientation, and surrounding environment, among other things. For example, the device 107 may include camera(s), microphone(s), accelerometer(s), a global positioning system (GPS) component, proximity sensor(s), magnetometers(s), thermometer(s), pressure sensor(s), gyroscope(s), and the like. Such sensors may be hardware sensors or software sensors, or sensors which include both hardware and software.

The CPU/GPU 305 retrieves and executes programming instructions stored in the memory 325. Similarly, the CPU/GPU 305 stores and retrieves application data residing in the memory 325. The interconnect 320 is used to transmit programming instructions and application data between the CPU/GPU, storage 330, network interfaces 315, and memory 325. CPU/GPU 305 is included to be representative of a single CPU, multiple CPUs, a single CPU having multiple processing cores, and the like. And the memory 325 is generally included to be representative of a random access memory. Storage 330, such as a hard disk drive or flash memory storage drive, may store non-volatile data.

Illustratively, the memory 325 includes a mobile operating system (O/S) 326 and an application 327. The mobile O/S 326 provides software configured to control the execution of application programs on the handheld device. The mobile O/S 326 may further expose application programming interfaces (APIs) which can be invoked to determine available device sensors, collect sensor data, and the like. The application 327, which itself includes an input validation component 327a, is configured to run on the mobile O/S 326. In one embodiment, the input validation component 327a may execute one or more validation tests 332 to determine whether an individual is interacting with the device. As discussed, such tests may include, e.g., challenges presented to a user, or, alternatively, such tests may be performed transparent to users. In general, such tests may collect sensor data from one or more of the sensor(s) 310 available on the device 105 and determine whether an individual is interacting with the device based on the collected data, as discussed in greater detail below.

In one embodiment, the application 327 may receive user input, and the validation component 327a may then validate that the input was entered by a human using one or more of the validation tests 332. The application 327 may recognize the input as valid if human-device interaction is confirmed, and reject the input otherwise. For example, the application may be a web browser, and the input validation component may be a javascript application of a webpage. After a user clicks a "submit" button of a webpage form to, e.g., attempt to log in to a website, the javascript application may be called to determine whether an individual is interacting with the device. The javascript application may do so by applying one or more of the validation tests 332 and returning the results of the determination. Based on the results, the web browser may cause the data to be transmitted to a server if human-device interaction is confirmed, and display an error message otherwise. Of course, the application 327 may also be other types of applications, such as games, e-mail clients, etc. running on the handheld device which require input validation (e.g., to log into the game, e-mail client, etc.), and the input validation component 327a may be, e.g., a function that, when called, returns a boolean value indicating whether an individual is interacting with the device.

Although shown as an application 327 on the handheld device, the application 327 may be a server-side application. In such the case, the server-side application may, similar to the client-side application above, present challenges, collect data from the device sensor(s) 310, etc. and determine based on collected sensor data whether an individual is interacting with the device. For example, Adobe® Flash® permits servers to access client device sensors, so a Flash® application may include server-side input validation through detection of human interaction with the device.

As shown, the storage 330 includes sensor data 331 and validation tests 332. The sensor data may indicate the handheld device's 105 position, orientation, and surrounding environment, among other things, which are measured by one or more of the sensor(s) 310. Depending on the validation test, the sensor data 331 may be data from an instant in time, or the sensor data 331 may include measurements taken over a period of time. For example, the validation test may determine whether an individual is interacting with the device based on facial recognition, and the sensor data 331 may include an image captured by a camera at a single instant in time. As another example, the validation test may determine whether an individual is interacting with the device from movement of the handheld device 105. In such a case, the input validation component 327a may, e.g., register an event listener for monitoring changes in position of the handheld device 105 over time. Data relating to such changes may then be stored in storage 330 as sensor data 331.

As noted, the validation tests 332 are configured to determine whether input is human input by determining whether an individual is interacting with the device. As discussed, various types of tests may be used, including challenge tests and tests which are transparent to users. Additionally, new validation tests may be downloaded by the application 327 and stored in storage 330. For example, a new challenge test may be downloaded each time a user navigates to a login screen of the application 327, and the user may be required to complete the challenge before the user's input is accepted.

Of course, one of ordinary skill in that art will recognize that the handheld device 105 is provided as a reference example and that variations and modifications are possible as well as other devices, e.g., computing tablets with similar accelerometers sensors, or a laptop with a camera that can capture an image of an individual interacting with the laptop.

Figure 4:
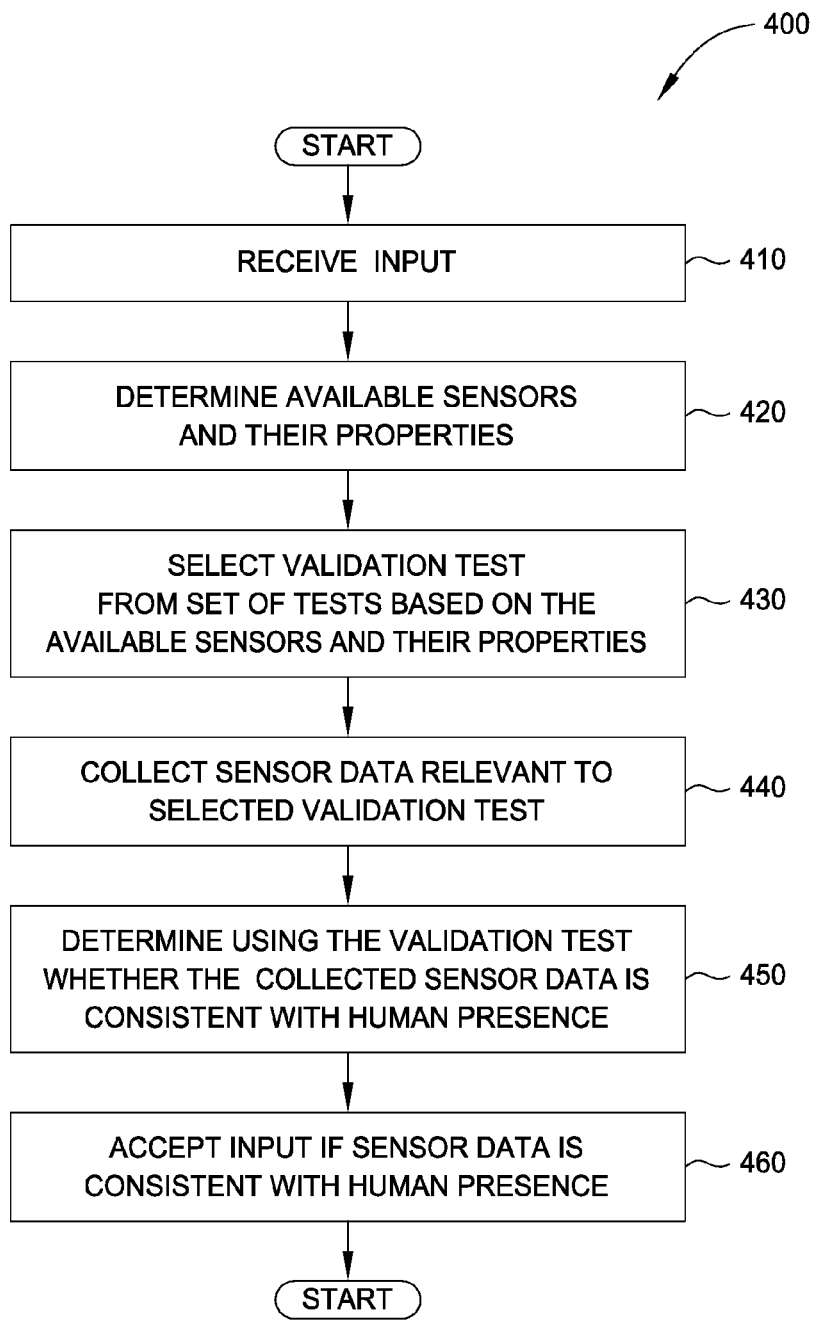
FIG. 4 illustrates a method for validating input on a handheld device by determining whether an individual is interacting with the device, according to one embodiment of the invention.

FIG. 4 illustrates a method 400 for validating input on a handheld device by determining whether an individual is interacting with the device, according to one embodiment of the invention. As shown, the method 400 begins at step 410, where an application receives user input. Such input may generally be of any form (e.g., text, images, videos, etc) and may be associated with a request to access a computing resource. For example, the input may include login credentials for logging in to a website. As another example, the input may include text entered in a form for creating a user account. By validating that such input is actually entered by a human, the application may prevent automated programs from accessing the resource to, e.g., guess username/password combinations, create fake accounts, etc.

At step 420, the application determines the sensors available on the device. For example, the handheld device's operating system may provide an application programming interface (API) having one or more functions which return available sensors and sensor capabilities. In such a case, the application may invoke the API functions to determine the sensors available on the device. Of course, the application may determine which sensors are available and sensor properties in any other technically feasible manner.

At step 430, the application selects a validation test from a set of one or more tests based on the available sensors and their properties. In one embodiment, one or more tests which are tailored to various types of sensors may be stored in a data storage of the handheld device. In a further embodiment, additional tests may be downloaded (e.g., periodically, whenever a webpage is visited, etc.) and stored in the data storage. The application may select from the plurality of validation tests tailored to various types of sensors. For example, one validation test may use a camera to capture an image, then determine via facial recognition if a human face appears in the image. Another validation test may use data collected from an accelerometer to determine whether the handheld device is shaking in a manner consistent with the device being held by a user. Given such validation tests, the application may select a particular test based on, e.g., whether there is an available camera and/or accelerometer, whether the properties of any available camera and/or accelerometer are suitable for the test, and the like.

In one embodiment, validation tests may present challenges to the user. For example, the tests may present text messages such as "Walk 5 feet," "Shake me!," "Shake your head," "Hum a tune," etc. on a display screen of the handheld device. The tests may collect data from appropriate sensors, such as accelerometers, gyroscopes, cameras, microphones, and the like, and determine based whether the challenge has been completed (e.g. whether the device has moved 5 feet, has been shaken, whether the user has shaken his/her head or hummed a tune, etc.). As discussed, such challenges may generally be designed so that automated programs have difficulty performing them.

Alternatively, validation tests may be transparent to the user of the handheld device. That is, the tests may be configured such that the user is generally unaware of the fact that input is being validated or that human interaction with the device is being determined. For example, a validation test may, without notifying or presenting a challenge to the user, collect accelerometer data and use such data to determine whether the movement of the handheld device is consistent with that of a device being held in human hands. As another example, the validation test may be integrated into a game, and the application may collect accelerometer data during ordinary gameplay or other in-game interactions. Such collected data may then be used for input validation.

In a further embodiment, the application may switch to a non-transparent validation test after a transparent validation test fails. For example, if the transparent accelerometer test fails (e.g., because the handheld device is on a table), the application may then present an explicit challenge (e.g., "Shake me!") to the user and determine whether an individual is interacting with the device based on whether the challenge is successfully completed.

In yet another embodiment, the application may download new validation tests from a server. As discussed, a new challenge test may be downloaded, e.g., each time a user navigates to a login screen of the application, and the user may be required to complete the challenge before the user's input is accepted.

At step 440, the application collects sensor data relevant to the selected validation test. For instance, the handheld device's operating system may provide an application programming interface (API) having one or more functions which return sensor data. In such a case, the application may call those API functions to, e.g., retrieve current sensor data, monitor changes in sensor data, and the like. Here, the particular data collected may depend on the validation test which is selected at step 430. A validation test based on facial detection may, for example, collect data by calling an API function which returns a camera image. In contrast, a validation test based on movement may, for example, call an API function which monitors changes in position, acceleration, orientation, etc. over a period of time.

At step 450, the application determines, using the selected validation test, whether the collected sensor data is consistent with an individual interacting with the device. The validation test may ascertain whether an individual is interacting with the device in any feasible manner, and the manner of ascertaining whether an individual is interacting with the device may generally vary for tests using different types of sensor data. For example, a validation test which relies on camera images may be configured to determine, using on one or more images, whether a human face is present in the images. Here, the facial recognition algorithm need not be complicated, and may not necessarily recognize the actual individual depicted in the images. That is, the facial recognition algorithm may simply determine based on, e.g., various image features, shapes, colors, etc., whether any human face appears in the images. As another example, validation tests which use accelerometer, magnetometer, or gyroscope data may determine whether or not the handheld device is moving, shaking, etc. In yet another case, the validation test may prompt a user to perform a challenge action (e.g., "Walk 5 feet," "Hum a tune," "Move your head from left to right"), and determine using appropriate sensors (e.g., accelerometers, microphones, cameras, etc.) whether the challenge is successfully completed. Of course, one or more validation tests may be used together, and other validation tests may be used in addition to, or in lieu of, those described above.

At step 460, the application accepts the input received at step 410 if the sensor data is consistent with an individual interacting with the device. The application may accept the input in various ways depending on the nature of the input. For instance, the application may accept input for creating an online account by sending an HTTP message to a server on which the account is to be created. As another example, the application may accept a password for accessing a game running on the device by permitting the user to play the game.

In an alternative embodiment, the application may return an indication of whether human-device interaction is detected, without sending data, permitting access to an application, and the like. For example, the application may be a method which is called to determine human-device interaction, and such a method may simply return a boolean value indicating whether human-device interaction is detected.

Figure 5A:
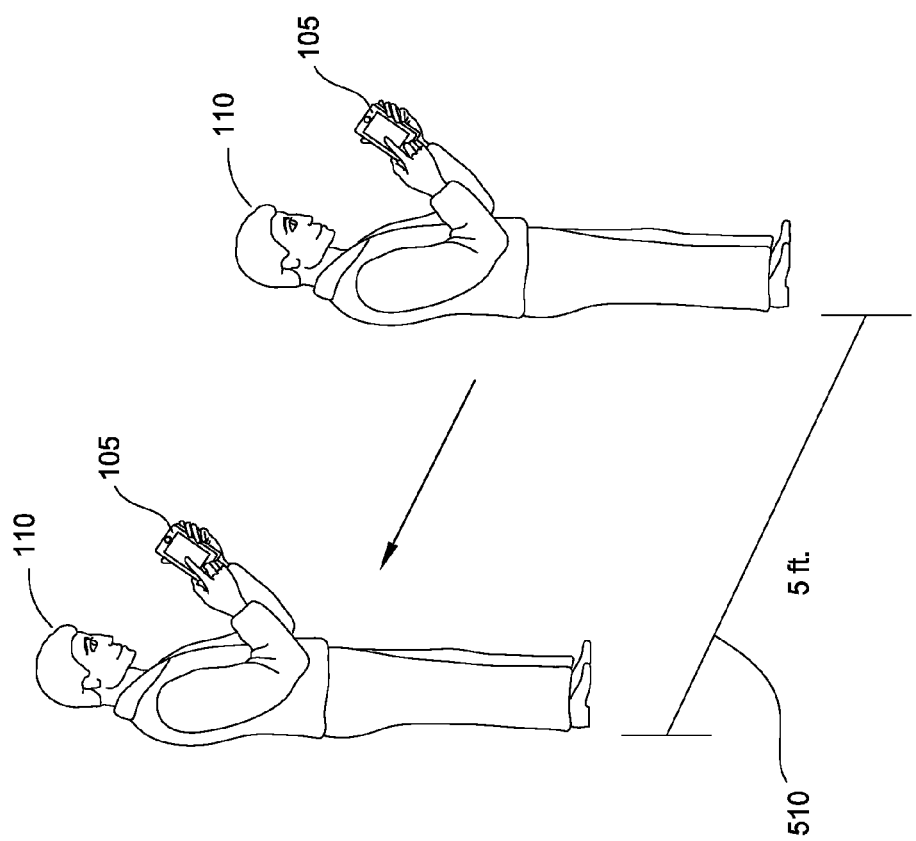
FIGS. 5A-5B illustrate a user completing example challenges presented to validate input, according to one embodiment of the invention.
Figure 5B:
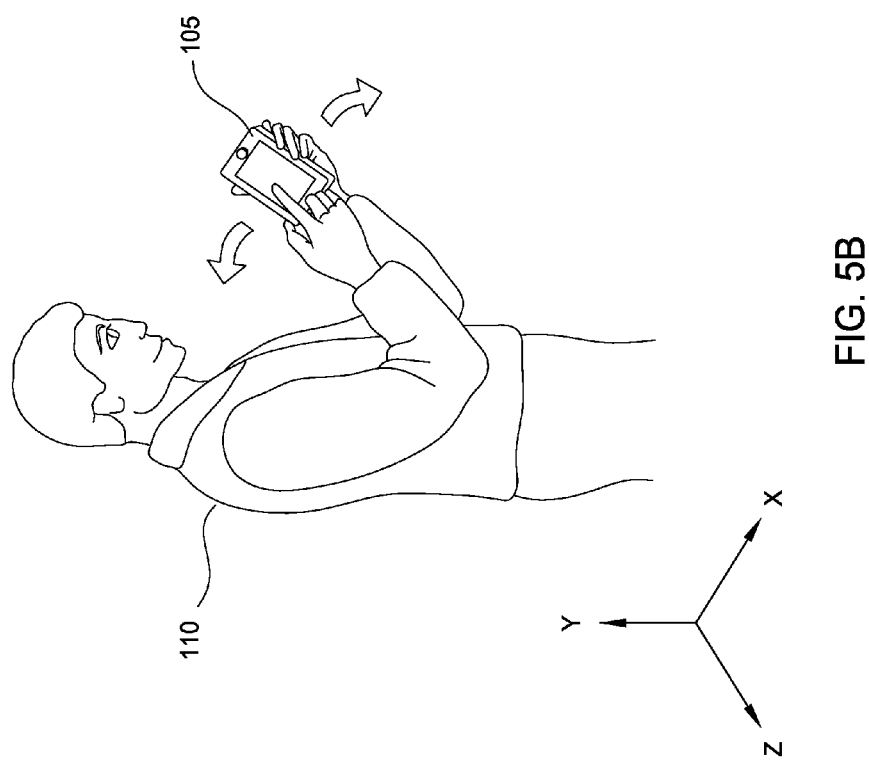

FIGS. 5A-5B illustrate a user completing example challenges presented to validate input, according to one embodiment of the invention. Of course, one of ordinary skill in the art will recognize that the challenges shown in FIGS. 5A-5B are merely examples, and such challenges may be modified in a variety of ways or otherwise tailored for use in a particular case.

FIG. 5A illustrates an example challenge in which a user 110 is instructed to walk with the handheld device 110 five feet 510 to his or her left. Such a challenge may be difficult for a computer program to perform, as the program may be unable to physically move the handheld device 105 over the five feet distance. In one embodiment, an application running on the handheld device 105 may present a "Walk 5 feet to your left" message to the user 110 via a display screen of the device 105. The application may then collect device sensor data (e.g., accelerometer data, GPS data, compass data, etc.) indicating movement of the device 105, and determine whether the device 105 moves roughly five feet to the left of its initial position. For example, the application may call an API function exposed by an operating system of the device and register an event listener for monitoring data from one or more of the accelerometer sensor and GPS sensor. Based on the data, the application may track the acceleration and movement of the device 105 and determine whether the movement takes the device 105 roughly five feet to the left of its initial position. If the device 105 has indeed moved roughly five feet to the left, the application may validate previously-received input as human input and accept the input, as discussed above.

FIG. 5B illustrates an example challenge in which a user 110 is instructed to shake a handheld device 105. Such a challenge may be difficult for a computer program to perform, as the program may be unable to cause the handheld device 105 to physically shake. Similar to the example above with respect to moving five feet to the left, an application running on the handheld device 105 may present a "Shake me!" message to the user 110 via a display screen of the device 105. The application may then collect device sensor data (e.g., accelerometer data, gyroscope data, etc.) indicating movement of the device 105, and determine whether the device 105 is shaking. For example, the application may call an API function exposed by an operating system of the device and register an event listener for monitoring data from an accelerometer and gyroscope of the device 105. Based on the data, the application may track the acceleration, gravity force, and rate of rotation of the device 105 to determine whether the movement includes quick acceleration changes indicative of a shake. If the application determines that the device 105 is indeed shaking, the application may validate previously-received input as human input and accept the input, as discussed above.

Although described above with respect to handheld devices, embodiments of the invention may be adapted for use with a variety of computing devices having sensors. For example, a camera and/or a microphone of a desktop computer may be used to validate input as human input according to techniques described herein.

Advantageously, embodiments disclosed herein permit input to be validated as human input without requiring a user to complete difficult challenges such as reading distorted text. In some embodiments, input validation may even be transparent to users. As a result, embodiments disclosed herein may increase accessibility and/or be more secure than, e.g., CAPTCHA challenges based on distorted text.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for an application to verify presence of an individual interacting with a handheld device versus an automated program executing on the handheld device, the computer-implemented method comprising:
   prior to presenting any explicit presence challenge on the handheld device:
      receiving a request from the handheld device;
      subsequent to receiving the request, collecting, based on an implicit presence test and from one or more sensors of the handheld device, implicit presence data characterizing a movement or position of the handheld device; and
      upon determining, based on the implicit presence data and by operation of one or more computer processors when executing the application, presence of an individual interacting with the handheld device, approving the request;
   wherein the application is configured to, upon determining, based on the implicit presence data, that presence of the individual interacting with the handheld device is inconclusive, present an explicit presence challenge on the handheld device in order to verify presence of the individual interacting with the handheld device, including the application being configured to:
      collect, from at least one sensor of the handheld device, explicit presence data responsive to the explicit presence challenge;
      upon determining, based on the explicit presence data, presence of the individual interacting with the handheld device, approve the request; and
      upon determining, based on the explicit presence data, absence of any individual interacting with the handheld device, deny the request as having been submitted by an automated program;
   wherein at least one of the implicit presence test and the explicit presence challenge is selected based on sensor availability and one or more sensor properties.

2. The computer-implemented method of claim 1, wherein the explicit presence challenge is presented via a display screen of the handheld device.

3. The computer-implemented method of claim 1, wherein the sensors include one or more of a microphone, an accelerometer, a global positioning system component, a proximity sensor, a magnetometer, a thermometer, a pressure sensor, and a gyroscope.

4. The computer-implemented method of claim 1, wherein the request specifies one of login credentials and account creation information.

5. The computer-implemented method of claim 1, wherein the request specifies to access a protected computing resource.

6. The computer-implemented method of claim 1, wherein determining presence of the individual interacting with the device comprises determining whether at least one image, captured via a camera on the handheld device while collecting the data, depicts any individual.

7. The computer-implemented method of claim 1, wherein the explicit presence challenge is presented via a display screen of the handheld device, wherein the one or more sensors are configured to acquire physical data.

8. The computer-implemented method of claim 7, wherein the implicit presence data is only collected from available sensors and not collected from at least one sensor determined to be unavailable, wherein the request specifies to access a protected computing resource, wherein the request specifies, in respective instances: (i) login credentials and (ii) account creation information.

9. The computer-implemented method of claim 8, wherein determining presence of the individual interacting with the device comprises determining whether at least one image, captured via a camera on the handheld device while collecting the data, depicts any individual;
   wherein the presence of the individual interacting with the handheld device is determinable from input based on explicit presence data collected from each sensor selected from: (i) a microphone; (ii) an accelerometer; (iii) a global positioning system component; (iv) a proximity sensor; (v) a magnetometer; (vi) a thermometer; (vii) a pressure sensor; (viii) a gyroscope; and (ix) a keyboard input sensor.

10. The computer-implemented method of claim 1, wherein the one or more sensors are configured to acquire physical data.

11. The computer-implemented method of claim 1, wherein the implicit presence data is only collected from available sensors and not collected from at least one sensor determined to be unavailable.

12. A non-transitory computer-readable medium storing an application executable to perform an operation to verify presence of an individual interacting with a handheld device versus an automated program executing on the handheld device, the operation comprising:
   prior to presenting any explicit presence challenge on the handheld device:
      receiving a request from the handheld device;
      subsequent to receiving the request, collecting, based on an implicit presence test and from one or more sensors determined to be available at the handheld device, implicit presence data characterizing a movement or position of the handheld device; and
      upon determining, based on the implicit presence data and by operation of one or more computer processors when executing the application, presence of an individual interacting with the handheld device, approving the request;
   wherein the application is configured to, upon determining, based on the implicit presence data, that presence of the individual interacting with the handheld device is inconclusive, present an explicit presence challenge on the handheld device in order to verify presence of the individual interacting with the handheld device, including the application being configured to:
      collect, from at least one sensor of the handheld device, explicit presence data responsive to the explicit presence challenge;
      upon determining, based on the explicit presence data, presence of the individual interacting with the handheld device, approve the request; and
      upon determining, based on the explicit presence data, absence of any individual interacting with the handheld device, deny the request as having been submitted by an automated program;
   wherein at least one of the implicit presence test and the explicit presence challenge is selected based on sensor availability and one or more sensor properties.

13. The non-transitory computer-readable medium of claim 12, wherein the explicit presence challenge is presented via a display screen of the handheld device.

14. The non-transitory computer-readable medium of claim 12, wherein the request specifies one of login credentials and account creation information.

15. The non-transitory computer-readable medium of claim 12, the operation further comprising, prior to collecting data, receiving a wherein the request specifies to access a protected computing resource.

16. The non-transitory computer-readable medium of claim 12, wherein the one or more sensors are configured to acquire physical data.

17. A handheld device to verify presence of an individual interacting with the handheld device versus an automated program executing on the handheld device, the handheld device comprising:
   one or more computer processors;
   one or more sensors monitoring movement or position of the handheld device; and
   a memory containing an application executable by the one or more computer processors to perform an operation comprising:
      prior to presenting any explicit presence challenge on the handheld device:
         receiving a request from the handheld device;
         subsequent to receiving the request, collecting, based on an implicit presence test and from one or more sensors determined to be available at the handheld device, implicit presence data characterizing a movement or position of the handheld device; and
         upon determining, based on the implicit presence data, presence of an individual interacting with the handheld device, approving the request;
   wherein the application is configured to, upon determining, based on the implicit presence data, that presence of the individual interacting with the handheld device is inconclusive, present an explicit presence challenge on the handheld device in order to verify presence of the individual interacting with the handheld device, including the application being configured to:
      collect, from at least one sensor of the handheld device, explicit presence data responsive to the explicit presence challenge;
      upon determining, based on the explicit presence data, presence of the individual interacting with the handheld device, approve the request; and
      upon determining, based on the explicit presence data, absence of any individual interacting with the handheld device, deny the request as having been submitted by an automated program;
   wherein at least one of the implicit presence test and the explicit presence challenge is selected based on sensor availability and one or more sensor properties.

18. The handheld device of claim 17, wherein the explicit presence challenge is presented via a display screen of the handheld device.

19. The handheld device of claim 17, wherein the sensors include one or more of a microphone, an accelerometer, a global positioning system component, a proximity sensor, a magnetometer, a thermometer, a pressure sensor, and a gyroscope.

20. The handheld device of claim 17, wherein the request specifies one of login credentials and account creation information.

21. The handheld device of claim 17, wherein the request specifies to access a protected computing resource.

22. The handheld device of claim 17, wherein the one or more sensors are configured to acquire physical data.

* * * * *